(12) United States Patent
Kasuya

(10) Patent No.: US 11,724,577 B2
(45) Date of Patent: Aug. 15, 2023

(54) DOOR STRUCTURE

(71) Applicant: HONDA MOTOR CO., LTD., Tokyo (JP)

(72) Inventor: Takashi Kasuya, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/580,087

(22) Filed: Jan. 20, 2022

(65) Prior Publication Data

US 2022/0250451 A1  Aug. 11, 2022

(30) Foreign Application Priority Data

Feb. 5, 2021 (JP) .................................. 2021-017485

(51) Int. Cl.
*B60J 5/04* (2006.01)

(52) U.S. Cl.
CPC ............. *B60J 5/0425* (2013.01); *B60J 5/045* (2013.01); *B60J 5/0437* (2013.01); *B60J 5/0443* (2013.01); *B60J 5/0469* (2013.01)

(58) Field of Classification Search
CPC ....... B60J 5/0425; B60J 5/0437; B60J 5/0443
USPC ...................................................... 296/146.6
See application file for complete search history.

(56) References Cited

U.S. PATENT DOCUMENTS 5,470,125 A    11/1995  Yamazaki et al.
5,599,057 A *   2/1997  Hirahara ................ B62D 21/15
                                                    296/187.12
5,755,484 A *   5/1998  Chou ..................... B60J 5/0447
                                                    296/146.7
8,042,860 B2 * 10/2011  Takahashi .............. B60J 5/0437
                                                    296/146.6
2013/0147229 A1  6/2013  Han
2017/0080979 A1  3/2017  Sato et al.

FOREIGN PATENT DOCUMENTS

| DE | 102012106760 A1 * | 6/2013 | ................ B60J 5/04 |
|----|-------------------|--------|---------------------------|
| JP | H06-255365 A | 9/1994 | |
| JP | 2001-138742 A | 5/2001 | |
| JP | 2004-010011 A | 1/2004 | |
| JP | 2013-119372 A | 6/2013 | |
| JP | 2017-056881 A | 3/2017 | |
| KR | 20170091384 A | 8/2017 | |

OTHER PUBLICATIONS

Office Action received in corresponding Japanese application No. 2021-017485 dated Aug. 2, 2022 with English translation (8 pages).

* cited by examiner

*Primary Examiner* — Joseph D. Pape
(74) *Attorney, Agent, or Firm* — Rankin, Hill & Clark LLP

(57) ABSTRACT

A door structure includes a door panel, a first beam member, a first bracket attached to a rear end portion of the first beam member, a second beam member formed separately from the first beam member, a second bracket attached to a rear end portion of the second beam member and formed separately from the first bracket, and a coupling member, to which the first bracket and the second bracket are fixed to be arranged side by side, and which is attached to the door panel. The coupling member includes an extending portion extending in a vehicle width direction between the first bracket and the second bracket.

7 Claims, 4 Drawing Sheets

DOOR STRUCTURE

The present application claims the benefit of priority to Japanese Patent Application No. 2021-017485 filed on Feb. 5, 2021, the disclosures of all of which are hereby incorporated by reference in their entireties.

BACKGROUND

Technical Field

The present disclosure relates to a door structure.

Related Art

Conventionally, in a door structure, a vertical beam for locking a hinge portion is provided at a front part of a door of a vehicle. Two beams extend from the vertical beam rearward of the vehicle. These two beams are welded to one bracket provided on a rear side in the door (for example, Japanese Patent Application Publication H6-255365).

SUMMARY

In such a conventional door structure, however, in a case where the beams and the bracket are welded and are then conveyed to an assembly line, there is a problem that work efficiency is reduced at the time of conveyance due to an increase in component size.

The present disclosure is intended to provide a door structure capable of suppressing an increase in component size.

A door structure according to the present disclosure includes: a door panel; a first beam member; a first bracket attached to an end portion of the first beam member; a second beam member formed separately from the first beam member; and a second bracket attached to an end portion of the second beam member and formed separately from the first bracket. The door structure further includes a coupling member, to which the first bracket and the second bracket are fixed to be arranged side by side, and which is attached to the door panel. The coupling member includes an extending portion extending in a vehicle width direction between the first bracket and the second bracket.

According to the door structure of the present disclosure, the door structure capable of suppressing an increase in component size is provided.

DETAILED DESCRIPTION

Figure 1:
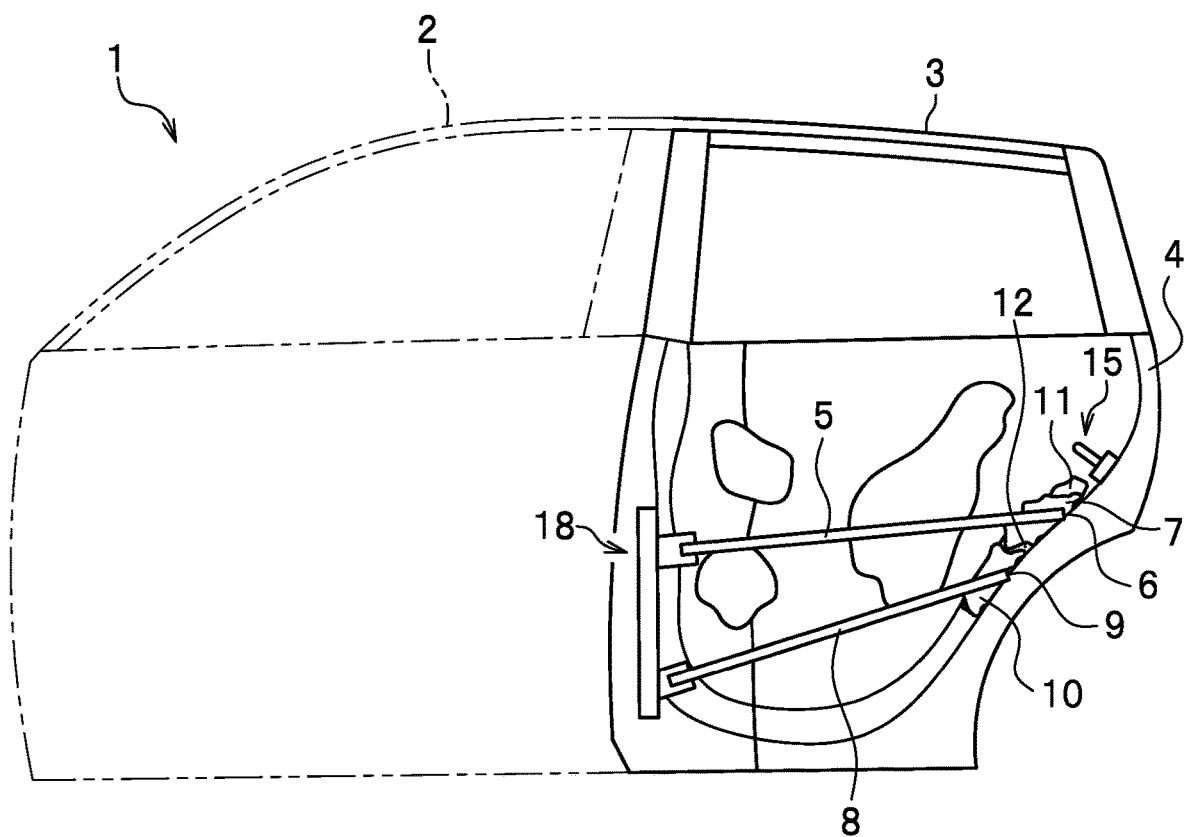
FIG. 1 is a side view of a door structure of an embodiment according to the present disclosure, in which an outer panel is removed, to illustrate an internal configuration of a door on a lateral side of a vehicle.
Figure 1:
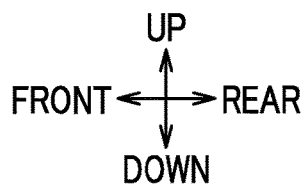

Hereinafter, an embodiment of the present disclosure will be described with reference to the drawings. The same elements are denoted by the same reference numerals, and duplicate descriptions will be omitted. When directions are described, basically, descriptions will be given based on a front and a rear, a left and a right, and an up and a down as viewed from a driver, unless otherwise specified. In addition, a "vehicle width direction" has the same meaning with a "right-left direction".

First, a configuration of a door structure in the present embodiment will be described.

As illustrated in FIG. 1, one or a plurality of door openings are formed on left and right side surfaces on a vehicle body of a vehicle 1. The door opening on each side surface is provided with a front door 2 and a rear door 3. In FIG. 1, the rear door 3 on the left side of the vehicle 1 will be described for the door structure in the present embodiment. In FIG. 1, for convenience of description, a door outer panel forming a design surface of the rear door 3 is omitted. Note that the rear door on the right side of the vehicle 1 is symmetrical with the rear door 3 on the left side, and a description thereof will be omitted accordingly.

The rear door 3 includes a door inner panel 4 (hereinafter, simply referred to as a "door panel 4"), a first beam member 5 having a rod shape, and a second beam member 8 having a rod shape, formed separately from the first beam member 5. The door panel 4 includes a door main body portion in which a recess is formed inside thereof, for accommodating the first beam member 5 and the second beam member 8, and a sash portion provided on an upper edge of the door main body portion and formed with a frame bar for supporting a window panel.

The first beam member 5 and the second beam member 8 attached to the door panel 4 have substantially the same size in a radial direction, and are each formed to be linear in a longitudinal direction.

A front end of the first beam member 5 is connected with a front-side fixing member 18 provided along a front edge of the door panel 4.

In addition, a front end of the second beam member 8 is connected with the front-side fixing member 18 at a position spaced apart downward from the front end of the first beam member 5.

The first beam member 5 and the second beam member 8 in the present embodiment are each inclined upward toward a rear side of the vehicle. In addition, a space between the first beam member 5 and the second beam member 8 in an up-down direction is decreased toward the rear side of the vehicle.

Further, the rear door 3 includes a first bracket 7 attached with a rear end portion 6 of the first beam member 5, and a second bracket 10 attached with a rear end portion 9 of the second beam member 8.

The first bracket 7 and the second bracket 10 are each made up of a metal material and are formed separately from each other. The first bracket 7 and the second bracket 10 respectively include beam attachment portions with which the rear end portions 6 and 9 are respectively attached, and joint surface portions to be spot welded to the door panel 4, together with a coupling member 11 to be described below.

Figure 2:
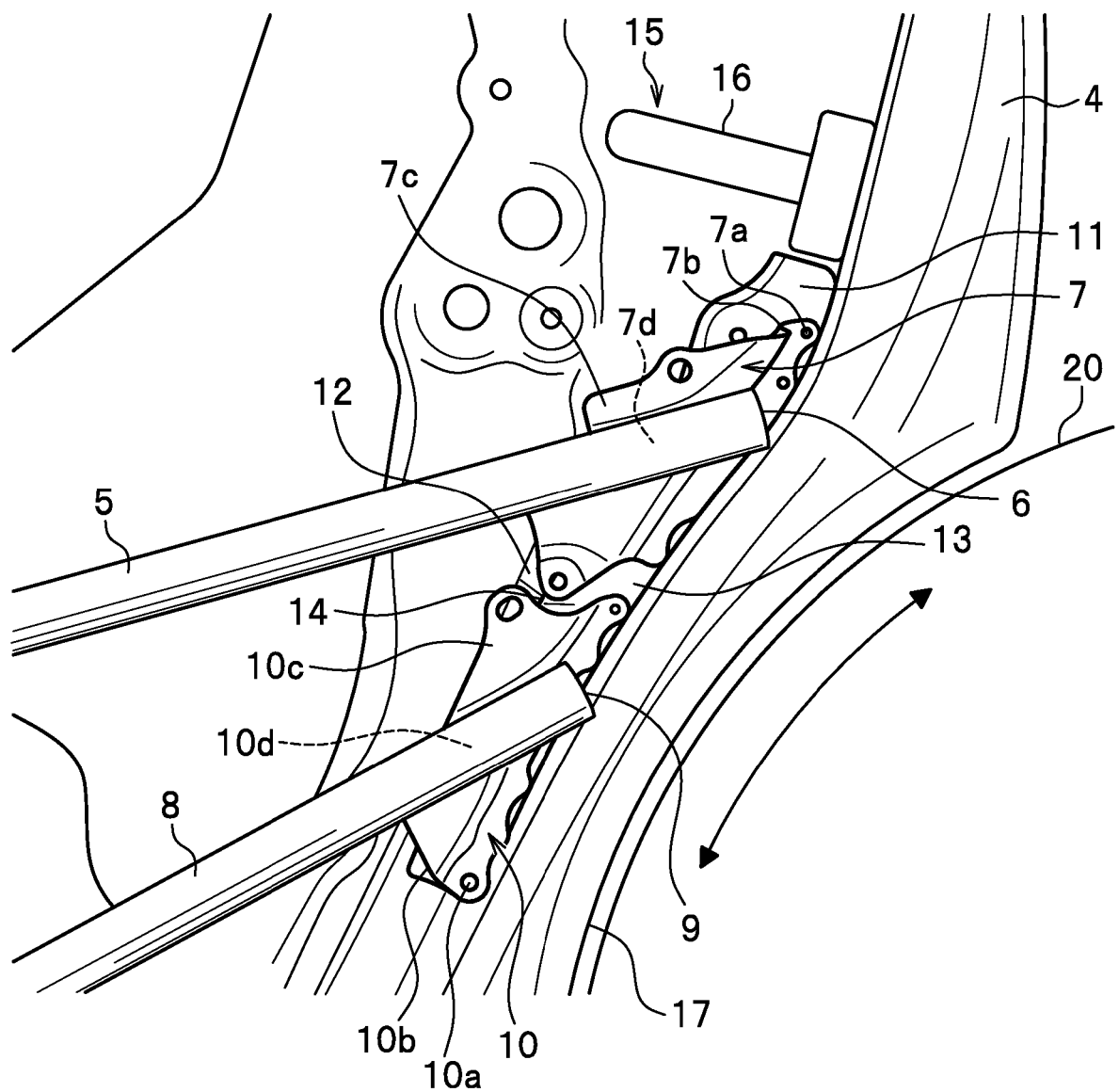
FIG. 2 is a perspective view of the door structure of the present embodiment, illustrating an entire configuration of a coupling member.

As illustrated in FIG. 2, the first bracket 7 and the second bracket 10 each have a crank shape in a cross-sectional view. Specifically, the first bracket 7 and the second bracket 10 respectively include joint surface portions 7a and 10a extending in the up-down direction to be joined to the coupling member 11, rising portions 7b and 10b rising outward in the vehicle width direction from front end edges of the joint surface portions 7a and 10a, extending face portions 7c and 10c extending forward from tip ends of the rising portions 7b and 10b, and beam attachment portions 7d and 10d recessed in substantially the center parts of the extending face portions 7c and 10c in the up-down direction to be attached with the first beam member 5 and the second beam member 8.

The first beam member 5 and the second beam member 8 can be individually conveyed with the first bracket 7 and the second bracket 10 attached with the respective rear end portions 6 and 9. In this situation, the first bracket 7 and the second bracket 10 are different members from each other, and therefore the first beam member 5 and the second beam member 8 can be conveyed separately. Accordingly, neither the first beam member 5 nor the second beam member 8 is bulky at the time of being conveyed.

The rear door 3 is provided with the coupling member 11 that couples the first beam member 5 and the second beam member 8 with each other. The first beam member 5 and the second beam member 8 are attached to the rear door 3 via the coupling member 11.

As illustrated in FIG. 2, the coupling member 11 is made up of a metal material, and extends along the first bracket 7 and the second bracket 10 arranged side by side in the up-down direction.

The coupling member 11 has a L-shape in a horizontal cross-sectional view (see FIG. 4), and includes a door panel attachment portion 13 to be attached to the door panel 4 and an extending portion 12 extending from an end portion of the door panel attachment portion 13 in the vehicle width direction on an opposite side with respect to the second bracket 10.

In addition, the door panel attachment portion 13 in the present embodiment is interposed between the first bracket 7 and the second bracket 10, and the door panel 4, to be joined with each other into three layers.

As illustrated in FIG. 2, the door panel attachment portion 13 extends along the door panel 4 from the first bracket 7 to the second bracket 10.

The door panel attachment portion 13 is joined to the door panel 4 by a plurality of spot welds together with the first bracket 7 and the second bracket 10, respectively.

Figure 3:
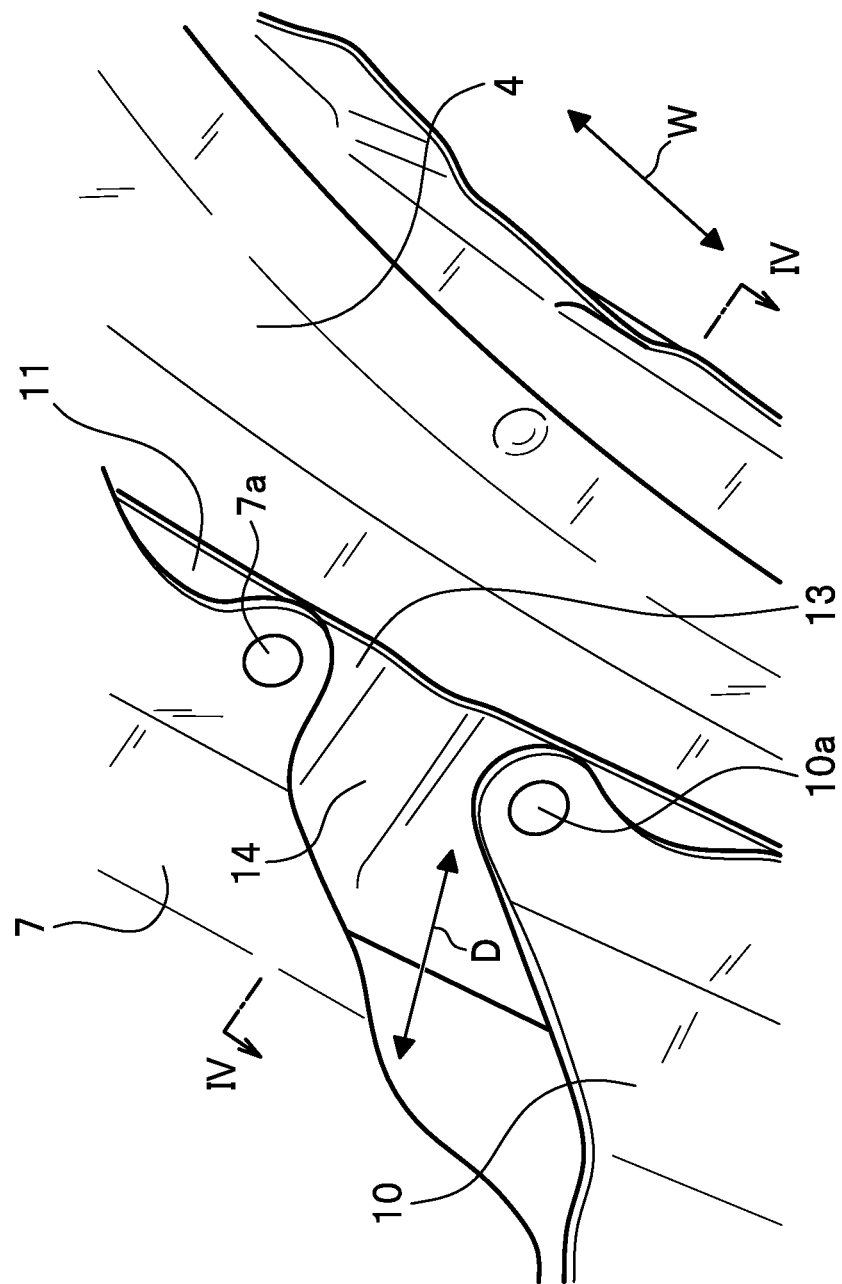
FIG. 3 is an enlarged side view of the door structure of the present embodiment, illustrating a main part of a recess of the coupling member.

As illustrated in FIG. 3, a recess 14 having a bead shape is formed between the first bracket 7 and the second bracket 10, in the door panel attachment portion 13. The recess 14 in the present embodiment is formed to extend in a front-rear direction D of the vehicle 1.

Figure 4:
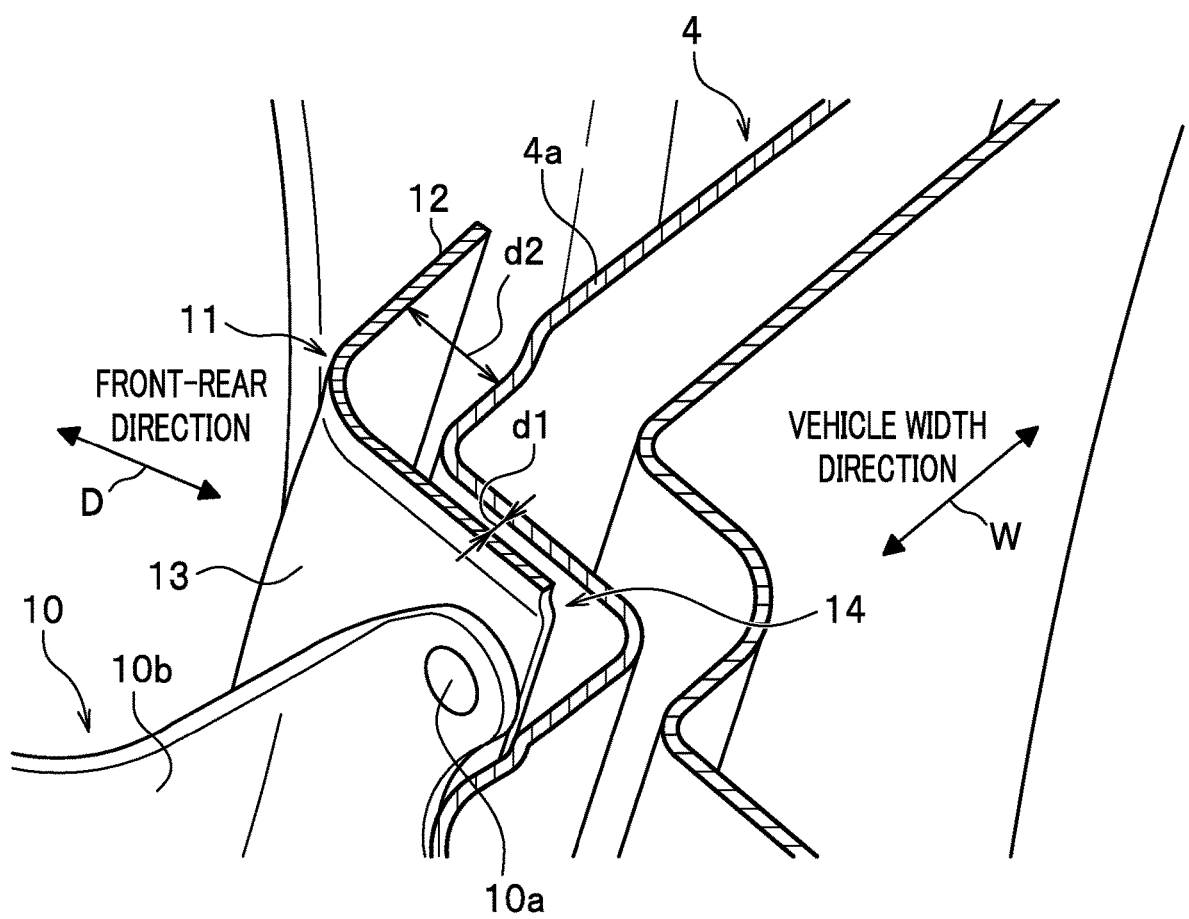
FIG. 4 is a cross-sectional view of the door structure of the present embodiment, at a position taken along a line IV-IV in FIG. 3.

As illustrated in FIG. 4, in the door structure in the present embodiment, a predetermined gap d1 is formed by the recess 14 between the door panel attachment portion 13 and the door panel 4. In addition, the extending portion 12 is disposed with a predetermined gap d2 from a surface 4a of the door panel 4, extending in the vehicle width direction.

As illustrated in FIG. 2, the door structure in the present embodiment includes a striker 16 as one of lock portion members 15. The striker 16 is formed separately from the coupling member 11. Then, the striker 16 is joined to the door panel 4 at a position spaced apart slightly upward from the coupling member 11.

In addition, as illustrated in FIG. 2, the door panel 4 includes a curved portion 17 formed in an arc shape along a shape of a tire 20.

Then, the door panel attachment portion 13 of the coupling member 11 is formed to have a curved shape to correspond to the curved portion 17. With such a configuration, the coupling member 11 is joined such that the door panel attachment portion 13 is arranged along the curved portion 17.

As described above, as illustrated in FIG. 1, the door structure in the present embodiment includes the door panel 4, the first beam member 5, the first bracket 7 to be attached with the rear end portion 6 of the first beam member 5, and the second beam member 8 formed separately from the first beam member 5. In addition, the door structure includes the second bracket 10 to be attached with the rear end portion 9 of the second beam member 8 and formed separately from the first bracket 7, and the coupling member 11, to which the first bracket 7 and the second bracket 10 are fixed to be arranged side by side, and which is attached to the door panel 4. The coupling member 11 includes the extending portion 12 extending in the vehicle width direction between the first bracket 7 and the second bracket 10.

In the door structure in the present embodiment configured as described above, the first bracket 7 is formed separately from the second bracket 10. Therefore, an increase in component size can be suppressed.

Specifically, the first bracket 7 and the second bracket 10 are coupled with each other by the coupling member 11. The coupling member 11 includes, over the entire length thereof, the extending portion 12 extending in the vehicle width direction.

Thus, the first bracket 7 and the second bracket 10 are reinforced by the coupling member 11 (extending portion 12), so that deformation due to a load input is suppressed.

Therefore, even in a case where the first beam member 5 and the second beam member 8 are individually conveyed, required strength is easily obtained in an attached state.

As illustrated in FIG. 2, the coupling member 11 includes the door panel attachment portion 13 extending from the first bracket 7 to the second bracket 10 along the door panel 4. The door panel attachment portion 13 is joined to the door panel 4 together with each the first bracket 7 and the second bracket 10.

The first bracket 7 and the second bracket 10 are welded to the door panel 4 via the door panel attachment portion 13 of the coupling member 11. Accordingly, when the coupling member 11 is attached to the door panel 4 by welding, similar to other welding points of the door panel 4, the first bracket 7 and the second bracket 10 are simultaneously fixed.

Therefore, it is not necessary to weld for integrating the first bracket 7 and the second bracket 10 with the coupling member 11 beforehand.

For this reason, when being conveyed, the first beam member 5 and the second beam member 8 can be individually conveyed. Furthermore, in the present embodiment, the first bracket 7, the second bracket 10, and the coupling member 11 can be conveyed individually.

Therefore, the component size in the conveyed state is reduced, so that work efficiency at the time of conveyance can be improved.

In addition, as illustrated in FIG. 3, the door panel attachment portion 13 includes the recess 14 spaced apart from the door panel 4.

Usually, an antirust agent is less likely to be impregnated over a part where panels overlap with each other, and there is a risk that rust is generated and coupling rigidity is weakened. In the door structure in the present embodiment, the gaps d1 and d2 are formed between the door panel 4 and the door panel attachment portion 13 by the recess 14 arranged in the coupling member 11 (see FIG. 4).

Then, the antirust agent is impregnated into the gaps d1 and d2, so that rust prevention processing can be easily performed. Accordingly, in the door structure in the present embodiment, the antirust agent spreads over an attachment part between the door panel 4 and the door panel attachment portion 13. Therefore, the generation of rust is prevented, and a decrease in the coupling rigidity can be suppressed.

Furthermore, as illustrated in FIG. 2, the recess 14 is formed between the first bracket 7 and the second bracket 10 in the coupling member 11.

Therefore, the antirust agent is impregnated into the gaps d1 and d2 of the recess 14, so that the generation of rust at the joint portion between the first bracket 7 and the second bracket 10 can be suppressed. Therefore, it is possible to suppress a decrease in rigidity in the recess 14 between the first bracket 7 and the second bracket 10.

The recess 14 is formed to extend in the vehicle front-rear direction.

This configuration of the recess 14 improves the rigidity of the coupling member 11. Therefore, it is possible to suppress an occurrence of a bending deformation between the first bracket 7 and the second bracket 10.

In this manner, the recess 14, which efficiently intersects with a part where the bending deformation is likely to occur due to a side collision input, is made to extend, so that the rigidity can be efficiently improved.

Furthermore, the door structure in the present embodiment includes the lock portion member 15, which is formed separately from the coupling member 11.

Accordingly, the coupling member 11 can be formed separately from the lock portion member 15, to be individually disposed on the door panel 4. For this reason, a load input due to a side collision is less likely to be transmitted as an impact to the lock portion member 15.

Therefore, there is no risk that the striker 16 of the lock portion member 15, the door panel 4 to which the striker 16 is attached, or the like is deformed or damaged.

Then, as illustrated in FIG. 2, the door panel 4 includes the curved portion 17 formed in an arc shape along the shape of the tire 20. The coupling member 11 is formed in a shape corresponding to the curved portion 17 to be joined thereto.

The curved portion 17 of the door panel 4 is formed in an arc shape. For this reason, a joining shape of the coupling member 11 is limited.

In addition, the coupling member 11 supports the respective rear end portions 6 and 9 of the first beam member 5 and the second beam member 8. Therefore, it is necessary to ensure an overlapping amount with the first beam member 5 and the second beam member 8 each having a predetermined dimension.

In the door structure in the present embodiment, the coupling member 11 formed in a shape corresponding to the curved portion 17 is disposed at the curved portion 17. Accordingly, the inclinations and the sizes of the first bracket 7 and the second bracket 10 can be optimized by ensuring a desired overlapping amount regardless of the shape of the curved portion 17 of the door panel 4.

Note that the description has been given of the rear door on the right side of the vehicle 1 in the present embodiment, which is symmetrical with the rear door 3 on the left side, but is not particularly limited to this. For example, a vehicle without the rear door on the right side may also be included. In this manner, regarding the shape, quantity, or material of the other doors, there is not particularly limited to the rear door 3 in the present embodiment.

In the door structure in the present embodiment, the first beam member 5 and the second beam member 8 that have been individually conveyed are attached to the curved portion 17 of the door panel 4 via the coupling member 11, with the first bracket 7 and the second bracket 10 being arranged side by side. In the attached state, the coupling member 11 gives required strength. For this reason, a door structure that is excellent in handling performance and that can suppress an increase in component size is provided.

The present disclosure is not limited to the above-described embodiment and can be modified variously. The above-described embodiment has been given as an example for easy understanding of the present disclosure, and are not necessarily limited to those including all the configurations that have been described. In addition, a part of the configuration in one embodiment can be replaced with the configuration in another embodiment, and the configuration in another embodiment can be added to the configuration in one embodiment. In addition, a part of the configuration in each embodiment can be deleted, or another configuration can be added or replaced. Modifications available from the above embodiment will be described as follows, for example.

In the door structure in the present embodiment, the description has been given of the striker 16 illustrated as the lock portion member 15, which is formed separately from the coupling member 11. However, the present disclosure is not particularly limited thereto. For example, a lock member such as a latch, a bracket for attaching the lock member to the door panel 4, and the like are included. Any member formed separately from the coupling member 11 is applicable, without the shape, quantity, or material being particularly limited thereto.

In addition, in the present embodiment, the description has been mainly given of the coupling member 11, which is applied to the rear door 3 located on the left surface part of the vehicle 1. However, the present disclosure is not particularly limited thereto. For example, the coupling member 11 may be used for the rear door 3 located on the right surface part, or may be used for the front door 2. Further, the coupling member 11 may be used for a sashless door without a sash portion. That is, any arrangement of the door to which the coupling member 11 is applied, any type of door such as a hinge door or a slide door, any quantity, and any material may be applicable.

What is claimed is:

1. A door structure comprising:
   a door panel;
   a first beam member;
   a first bracket attached to an end portion of the first beam member;
   a second beam member formed separately from the first beam member;
   a second bracket attached to an end portion of the second beam member and formed separately from the first bracket; and
   a coupling member, to which the first bracket and the second bracket are fixed to be arranged side by side, and which is attached to the door panel, wherein
   the coupling member includes an extending portion extending in a vehicle width direction away from the first bracket and the second bracket.

2. The door structure according to claim 1, wherein
   the coupling member includes a door panel attachment portion extending from the first bracket to the second bracket along the door panel, and
   the door panel attachment portion is joined to the door panel together with each the first bracket and the second bracket.

3. The door structure according to claim 2, wherein the door panel attachment portion includes a recess spaced apart from the door panel.

4. The door structure according to claim 3, wherein the recess is formed in a part of the coupling member between the first bracket and the second bracket.

5. The door structure according to claim 3, wherein the recess is formed to extend in a vehicle front-rear direction.

6. The door structure according to claim 1, further comprising a lock portion member formed separately from the coupling member.

7. The door structure according to claim 1, wherein
the door panel includes a curved portion formed in an arc shape, and
the coupling member is formed in a shape corresponding to the curved portion, and is joined to the curved portion.

* * * * *